(12) United States Patent
Ohtani et al.

(10) Patent No.: US 8,017,238 B2
(45) Date of Patent: Sep. 13, 2011

(54) TUNGSTEN OXIDE PHOTOCATALYST COMPRISING PLATINUM PARTICLES

(75) Inventors: Bunsho Ohtani, Sapporo (JP); Ryu Abe, Sapporo (JP); Yoshiaki Sakatani, Niihama (JP); Makoto Murata, Niihama (JP); Hiroaki Nishimine, Niihama (JP)

(73) Assignees: National University Corporation Hokkaido University, Hokkaido (JP); Sumitomo Chemical Company, Limited, Tokyo (JP)

( * ) Notice: Subject to any disclaimer, the term of this patent is extended or adjusted under 35 U.S.C. 154(b) by 542 days.

(21) Appl. No.: 12/057,420

(22) Filed: Mar. 28, 2008

(65) Prior Publication Data

US 2008/0241542 A1    Oct. 2, 2008

(30) Foreign Application Priority Data

Mar. 30, 2007 (JP) ................................ 2007-091200
Dec. 12, 2007 (JP) ................................ 2007-320556

(51) Int. Cl.
*B32B 5/16* (2006.01)
*B05D 7/00* (2006.01)
*C23C 18/14* (2006.01)

(52) U.S. Cl. ......... 428/403; 427/217; 427/584; 427/595
(58) Field of Classification Search .................. 428/403; 427/584, 595, 217; 423/22, 53, 265
See application file for complete search history.

(56) References Cited

U.S. PATENT DOCUMENTS

| | | | | |
|---|---|---|---|---|
| 5,547,823 A | * | 8/1996 | Murasawa et al. | 430/531 |
| 6,277,346 B1 | * | 8/2001 | Murasawa et al. | 423/239.2 |
| 2008/0119352 A1 | * | 5/2008 | Kitaguchi | 502/74 |
| 2011/0045964 A1 | * | 2/2011 | Abe et al. | 502/5 |

FOREIGN PATENT DOCUMENTS

JP      2001-38217 A      2/2001

OTHER PUBLICATIONS

Ryu Abe et al., "Highly Efficient Decomposition of Organic Compounds over Platinum-loaded Tungsten Oxide under Visible Light Irradiation", 100th CATSJ Meeting Abstracts, No. 1 A01, Catalyst, vol. 49, No. 6, (2007), pp. 382-384.

A. Sclafani et al., "Influence of platinum on catalytic activity of polycrystalline $WO_3$ employed for phenol photodegradation in aqueous suspension", Solar Energy Materials and Solar Cells, vol. 51, No. 2, (1998), pp. 203-219.

* cited by examiner

*Primary Examiner* — H. (Holly) T Le
(74) *Attorney, Agent, or Firm* — Sughrue Mion, PLLC

(57) ABSTRACT

To provide a tungsten oxide photocatalyst which shows a high photocatalytic activity by irradiating with visible light even under the environment where ultraviolet light is not irradiated, the tungsten oxide photocatalyst has tungsten oxide particles and Pt particles having a primary particle size of 3 to 20 nm supported on the surface of the tungsten oxide particles in an amount of 0.03 to 5 parts by weight based on 100 parts by weight of the tungsten oxide particles.

11 Claims, 3 Drawing Sheets

TUNGSTEN OXIDE PHOTOCATALYST COMPRISING PLATINUM PARTICLES

BACKGROUND OF THE INVENTION

1. Field of the Invention

The present invention relates to a tungsten oxide photocatalyst, particularly to a photocatalyst which shows high photocatalytic activity even under the environment where visible light is irradiated while ultraviolet light is not irradiated, and also can completely decompose organic materials such as acetic acid and acetaldehyde.

2. Description of the Related Art

When a semiconductor is irradiated with light having energy greater than the bandgap, electrons of the valence band are excited into the conduction band to form holes in the valence band and electrons in the conduction band. These electrons and holes respectively have strong oxidizing power and reducing power and exert an oxidation-reduction reaction on molecular species contacted with the semiconductor. Such a reaction is referred to as a photocatalytic reaction and such a semiconductor is referred to as a photocatalyst.

It is considered that, in a decomposition reaction of an organic material through a photocatalyst, holes formed in the valence band directly cause the oxidative decomposition of the organic material or holes cause oxidation of water, and reactive oxygen species formed therefrom cause oxidative decomposition of the organic material. It is also considered that electrons formed in the conduction band causes reduction of oxygen and reactive oxygen species formed therefrom cause oxidative decomposition of the organic material.

As the photocatalyst, a photocatalyst using tungsten oxide particles is known. The tungsten oxide particles can absorb visible light making up a majority of light in the indoor space, and is remarked as a visible light responsive photocatalyst. However, when the photocatalyst using tungsten oxide particles is irradiated with visible light, holes and electrons are respectively formed in the valence band and the conduction band through photoexcitation. Since the conduction band is located at the lower position than that of an oxidation-reduction level of oxygen, oxygen cannot be reduced by electrons excited to the conduction band and a sufficient amount of reactive oxygen species are not formed. Therefore, tungsten oxide did not show high photocatalytic activity under the environment where visible light is irradiated while ultraviolet light is not irradiated.

Japanese Unexamined Patent Publication (Kokai) No. 2001-038217 (Japanese Patent No. 3887510)) discloses a photocatalyst capable of efficiently decomposing a decomposition intermediate of acetaldehyde by forming a film made of a noble metal such as Pt on a tungsten oxide film. However, there was a problem that sufficient photocatalytic activity cannot be obtained and also an expensive apparatus is required to prepare the photocatalyst.

SUMMARY OF THE INVENTION

An object of the present invention is to provide a tungsten oxide photocatalyst which shows a high photocatalytic activity by irradiating with visible light even under the environment where ultraviolet light is not irradiated.

The present inventors have intensively studied about a tungsten oxide photocatalyst suited for use as a photocatalyst, and thus the present invention has been completed.

Namely, the present invention provides a tungsten oxide photocatalyst comprising tungsten oxide particles and Pt particles having a primary particle size of 3 to 20 nm supported on the surface of the tungsten oxide particles in an amount of 0.03 to 5 parts by weight based on 100 parts by weight of the tungsten oxide particles.

The tungsten oxide photocatalyst of the present invention shows high photocatalytic activity under irradiation with visible light, thus making it possible to cause oxidative decomposition of an organic compound.

DETAILED DESCRIPTION OF THE INVENTION

Figure 1:
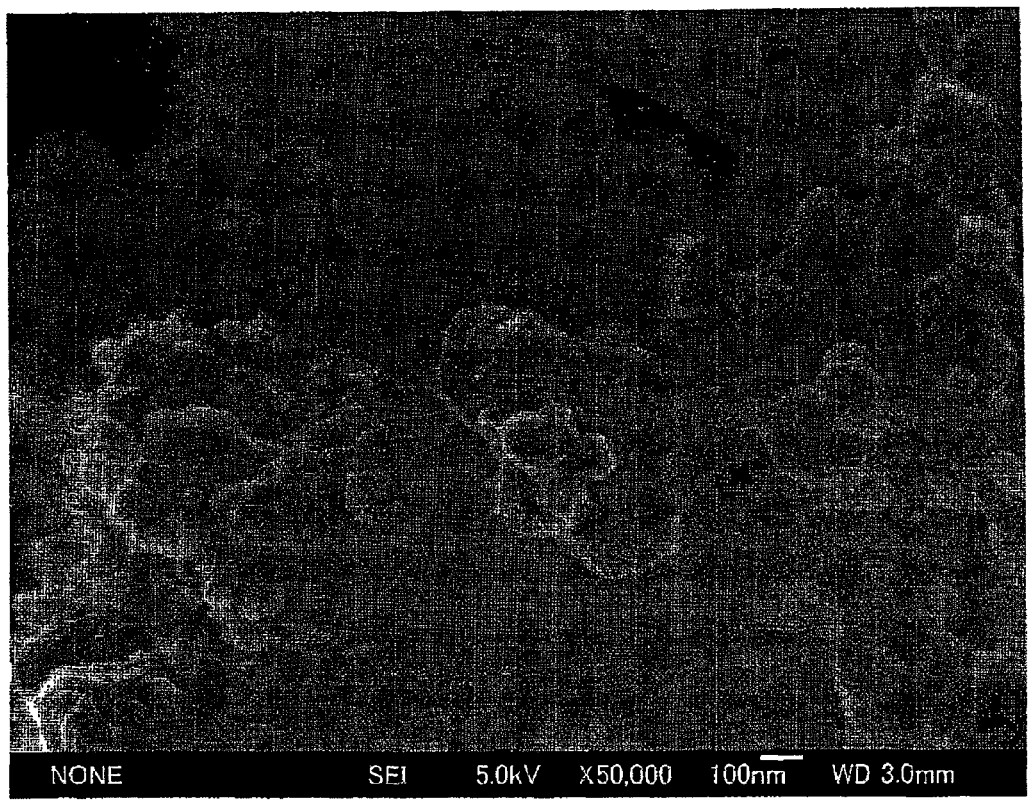
FIG 1 is a scanning electron microscope (SEM) micrograph of the tungsten oxide photocatalyst obtained in Example 1.

The tungsten oxide photocatalyst of the present invention includes tungsten oxide particles and Pt particles supported on the surface of the tungsten oxide particles.

Pt particles are made of platinum metal in the form of particles, and the primary particle size is 3 nm or more, preferably 5 nm or more, and 20 nm or less, preferably 10 nm or less. The primary particles may form agglomerated particles. In this case, a particle size of the agglomerated particles is preferably 10 nm or more and 30 nm or less. When the primary particle size of the Pt particles is less than 3 nm, photocatalytic activity decreases since it becomes difficult for electrons to efficiently move to oxygen from the conduction band of tungsten oxide. In contrast, when the primary particle size of the Pt particles is more than 20 nm, it becomes difficult to support Pt on the surface of the tungsten oxide particles, and thus photocatalytic activity decreases.

The amount of the Pt particles is 0.03 parts by weight or more, preferably 0.05 parts by weight or more, more preferably 0.1 parts by weight or more, and 5 parts by weight or less, preferably 3 parts by weight or less, more preferably 1 parts by weight or less, based on 100 parts by weight of the tungsten oxide particles. When the supporting amount is less than 0.03 parts by weight, the amount of the Pt particles to be supported decreases and the amount of oxygen to be reduced is insufficient, and thus high photocatalytic activity cannot be obtained. In contrast, when the amount is more than 5 parts by weight, the amount of the Pt particles, with which the surface of the tungsten oxide particles is coated, increases and the amount of light to be absorbed by the tungsten oxide particles decreases, and thus photocatalytic activity decreases.

It is preferred that Pt particles are independently supported on the surface at least a portion of the surface of tungsten oxide particles in a state where the Pt particles are contacted with each other, and are in the form of continuous beads. As used herein, the expression "independently supported" means that the respective Pt particles are also contacted with the surface of tungsten oxide particles. When particles are in the form of continuous beads, high catalytic activity is shown and also decomposition of the decomposition intermediate of the photocatalytic reaction is promoted.

Tungsten oxide particles constituting the tungsten oxide photocatalyst of the present invention are particles made of tungsten oxide and, when a particle size of 50% accumulation from fine particle side of accumulative particle size distribution of an agglomerated particle size of the tungsten oxide particles is D50, D50 is 0.01 μm or more, preferably 0.05 μm or more, and 5 μm or less, preferably 1 μm or less. When D50 is less than 0.01 μm, faults in manufacturing may occur since hard agglomerated particles are formed during a washing or drying step after supporting Pt particles. In contrast, when D50 is more than 5 μm, it becomes difficult to support Pt particles having a primary particle size defined in the present invention on the tungsten oxide particles, and thus the resulting tungsten oxide photocatalyst has low photocatalytic activity.

When a particle size of 10% accumulation from fine particle side of accumulative particle size distribution of an agglomerated particle size of the tungsten oxide particles is D10 and a particle size of 90% accumulation from fine particle side of accumulative particle size distribution of an agglomerated particle size of the tungsten oxide particles is D90, a value of D90/D10 is 1 or more and 10 or less, preferably 6 or less. When D90/D10 is more than 10, tungsten oxide particles having a large particle size simultaneously exist and it becomes difficult to support Pt particles having a primary particle size defined in the present invention on the tungsten oxide particles, and thus the resulting tungsten oxide photocatalyst has low photocatalytic activity The primary particle size of the tungsten oxide particles is 5 nm or more, preferably 10 nm or more, and 150 nm or less, preferably 120 nm or less. When the primary particle size is less than 5 nm, crystallinity of the tungsten oxide particles decreases and defects are easily formed in the crystal lattice, and thus photocatalytic activity decreases. In contrast, when the primary particle size is more than 150 nm, the surface area of the tungsten oxide particles decreases and a sufficient amount of a reactant is not adsorbed on the surface of the tungsten oxide photocatalyst, and thus photocatalytic activity decreases.

As tungsten oxide constituting the tungsten oxide particles, plural tungsten oxides whose tungsten has four to six valences are known. In the present invention, it is possible to use tungsten oxide particles, which show photocatalytic activity, alone among these tungsten oxide particles. It is particularly preferred to use particulate $WO_3$.

The method of preparing tungsten oxide particles includes, for example, a method in which an aqueous solution of tungstate such as sodium tungstate, calcium tungstate or ammonium tungstate is heated and mixed with hydrochloric acid or nitric acid to obtain tungstic acid, followed by washing, drying and further calcination. It is also possible to obtain tungsten oxide particles by thermally decomposing ammonium tungstate.

The method of producing the tungsten oxide photocatalyst of the present invention includes, for example, a method comprising the steps of:
(a) dispersing tungsten oxide particles in an aqueous solution containing a Pt compound dissolved therein in an amount corresponding to 0.03 to 5 parts by weight of Pt based on 100 parts by weight of tungsten oxide particles;
(b) irradiating with visible light in a wavelength range capable of photoexciting the tungsten oxide particles;
(c) adding a sacrificial agent; and
(d) further irradiating with visible light. According to such a method, Pt particles formed from the Pt compound is supported on the surface of tungsten oxide particles as particles having a particle size defined in the present invention, and thus the objective tungsten oxide photocatalyst can be obtained.

The aqueous solution of the Pt compound containing tungsten oxide particles dispersed therein may be irradiated with visible light while stirring the dispersion, or the aqueous solution may be irradiated with visible light while passing the dispersion through a transparent glass or a plastic tube.

As a light source used to irradiate visible light, those capable of irradiating visible light having a wavelength 410 nm or more can be used, and those capable of irradiating visible light without substantially irradiating ultraviolet light having a wavelength of less than 410 nm are preferred. Such a light source is not specifically limited as long as it can irradiate visible light capable of photoexciting tungsten oxide particles and, for example, a xenon lamp equipped with an optical filter capable of cutting light having a wavelength of less than 410 nm, a light emitting diode, a fluorescent lamp, a halogen lamp, and a mercury lamp can be used. It is also possible to irradiate with solar light through this optical filter as a matter of course. When ultraviolet light having a wavelength of less than 410 nm is not substantially irradiated, it is possible to obtain a photocatalyst in which Pt particles are in the form of continuous beads at least a portion of the surface of tungsten oxide particles.

The irradiation time of visible light is usually 30 minutes or more, preferably one hour or more, and usually 24 hours or less, preferably 6 hours or less. When the irradiation time of visible light is less than 30 minutes, the supporting amount of Pt particles decreases and photocatalytic activity decreases. In contrast, when the irradiation time is more than 24 hours, nearly the entire Pt compound is supported in the form of Pt particles and thus photocatalytic activity corresponding to cost required to irradiate with visible light cannot be obtained.

In the above method, the sacrificial agent is added after irradiating with visible light, and then irradiation with visible light is further carried out. When tungsten oxide particles are preliminarily dispersed in an aqueous solution of a Pt compound containing a sacrificial agent, followed by irradiation with visible light, loading of Pt on the surface of tungsten oxide particles occurs extremely quickly and the particle size of Pt particles cannot be controlled, and thus photocatalytic activity of the resulting tungsten oxide photocatalyst decreases.

There is also known a method in which Pt particles are supported on the surface of tungsten oxide particles by immersing tungsten oxide particles in an aqueous solution containing a Pt compound to remove moisture, followed by removing moisture and calcination. However, photocatalytic activity of the resulting photocatalyst decreases since the particle size of Pt particles cannot be controlled by this method.

It is possible to use, as the sacrificial agent, sacrificial agents which easily decompose oxidatively through a photocatalytic reaction induced by holes formed in the valence band of tungsten oxide when tungsten oxide particles are irradiated with light, for example, alcohols such as ethanol, methanol, and propanol; ketones such as acetone; and carboxylic acids such as oxalic acid. These sacrificial agents are added after irradiating with visible light for at least 30 minutes. When the sacrificial agent is solid, the solid may be used with or without adding to a suitable solvent.

Examples of the Pt compound include platinum chloride ($PtCl_2$, $PtCl_4$), platinum bromide ($PtBr_2$, $PtBr_4$), platinum iodide ($PtI_2$, $PtI_4$), platinum potassium chloride ($K_2PtCl_4$), hexachloroplatinic acid ($H_2PtCl_6$), platinum sulfite ($H_3Pt(SO_3)_2(OH)$), platinum oxide ($PtO_2$), tetraammine platinum chloride ($Pt(NH_3)_4Cl_2$), tetraammine platinum hydrogenphosphate ($Pt(NH_3)_4HPO_4$), tetraammine platinum hydroxide ($Pt(NH_3)_4(OH)_2$), tetraammine platinum nitrate ($Pt(NO_3)_2(NH_3)_4$), and tetraammine platinum tetrachloroplatinum (($Pt(NH_3)_4)(PtCl_4)$).

By further irradiating with visible light after adding the sacrificial agent, tungsten oxide particles are excited by visible light and the Pt compound is supported as Pt particles having a particle size defined in the present invention.

In such a manner, the tungsten oxide particles are preferably washed with water after supporting Pt particles on the surface of tungsten oxide particles. By washing with water, an contamination capable of inhibiting photocatalytic activity adhered on the surface of tungsten oxide particles can be washed off and photocatalytic activity can be improved. It is preferred to dry at a temperature within a range from room temperature to 150° C. after washing.

If necessary, the tungsten oxide photocatalyst of the present invention can be used in combination with various additives for the purpose of further improving adsorptivity and photocatalytic activity. Examples of the additive include silicon compounds such as amorphous silica, silica sol, water glass, and organopolysiloxane; aluminum compounds such as amorphous alumina, alumina sol, and aluminum hydroxide; aluminosilicates such as zeolite and kaolinite; alkali earth metal (hydr)oxides such as magnesium oxide, calcium oxide, strontium oxide, barium oxide, magnesium hydroxide, calcium hydroxide, strontium hydroxide, and barium hydroxide; calcium phosphate; molecular sieve; active carbon; hydroxides of metallic elements such as Ti, Zr, Hf, V, Nb, Ta, Cr, Mo, W, Mn, Tc, Re, Fe, Co, Ni, Ru, Rh, Pd, Os, Ir, Pt, Cu, Ag, Au, Zn, Cd, Ga, In, Tl, Ge, Sn, Pb, Bi, La, and Ce; oxides of these metallic elements; polycondensates of organic polysiloxane compounds; phosphates, fluorine-based polymers, silicon-based polymers; acrylic resins; polyester resins; melamine resins; urethane resins; and alkyd resins. These additives can be used alone, or two or more kinds of them can be used in combination.

The tungsten oxide photocatalyst of the present invention can be used as a coating solution after dispersing in water, alcohol, and organic solvent. If necessary, dispersants may be added for the purpose of improving dispersibility of the tungsten oxide photocatalyst. Furthermore, known inorganic binders and organic binders can be added for the purpose of improving adhesion between the resulting coating film and an equipment.

The coating solution may be applied on a wall, a ceiling, a windowpane, or a tile and then irradiated with light using a fluorescent lamp containing much visible light, a halogen lamp, a xenon lamp, a light emitting diode, or solar light.

EXAMPLES

The present invention will now be described in detail, but the present invention is not limited thereto. In the present invention, various measurements were carried out by the following procedures.

1. BET Specific Surface Area

BET specific surface area of tungsten oxide particles was measured by a nitrogen adsorption method using "NOVA1200e" (manufactured by Yuasa Ionics Inc.).

2. Measurement of Primary Particle Size of Tungsten Oxide Particles

A primary particle size of tungsten oxide particles was determined from the BET specific surface area. Primary particle size d (μm) is calculated by the equation: $d=6/(S\times\rho)$ where S (m$^2$/g) denotes a value of a BET specific surface area of a powder and ρ (g/cm$^3$) denotes density of particles. The primary particle size d is a diameter assumed that particles have a spherical form. Density of tungsten oxide particles (WO$_3$) was 7.16 g/cm$^3$.

3. Measurement of Particle Size Distribution of Agglomerated Particle Size of Tungsten Oxide Particles Particle size distribution of agglomerated particles of tungsten oxide particles was measured using a laser diffraction particle size analyzer (SALD-7000, manufactured by Shimadzu Corporation). Tungsten oxide particles were dispersed in pure water and the measurement was carried out. Particle sizes of 10% accumulation, 50% accumulation and 90% accumulation from fine particle side of accumulative particle size distribution were respectively determined as D10, D50 and D90. The value of D50 was taken as an agglomerated particle size, and a value of D90/D10 was determined as a measure of particle size distribution.

4. Measurement of Particle Size of Pt Particles

A particle size of Pt particles was measured using a scanning electron microscope (SEM, JSM-7400F, manufactured by JEOL Ltd.) and also scanning transmission electron microscope (STEM) observation was carried out using a field emission type electron microscope (JEM-2100F, manufactured by JEOL Ltd.) equipped with an energy-dispersive X-ray analyzer (EDX). The particle size measured was taken as a primary particle size.

5. Decomposition Reaction (Under Irradiation with Visible Light) of Acetic Acid

In a glass vessel, 50 mg of a particulate photocatalyst was suspended in 250 mL of 5 vol % aqueous acetic acid solution. After stirring under darkness for one hour, a visible light irradiation was carried out while stirring and, as a result, acetic acid was decomposed by a photocatalytic reaction. Then, the concentration of carbon dioxide as the complete decomposition product was determined by gas chromatography. As a light source, a xenon lamp (300 W, manufactured by Cermax) equipped with an ultraviolet light cut filter (L-42, manufactured by AGC TECHNO GLASS Co., Ltd.) was used.

6. Decomposition Reaction (Under Irradiation with Visible Light) of Acetaldehyde 50 mg of a particulate photocatalyst formed into pellets of 15 mmφ was placed on the bottom face of a glass vessel (volume: 330 mL) and the glass vessel was filled with synthetic air, and then 14.7 μmol of acetaldehyde was injected. After standing under darkness for one hour, visible light irradiation was carried out and, as a result, acetaldehyde was decomposed by a photocatalytic reaction. Then, the concentration of carbon dioxide as the complete decomposition product was determined by gas chromatography. As a light source, a xenon lamp (300 W, manufactured by Cermax) equipped with an ultraviolet light cut filter (L-42, manufactured by AGC TECHNO GLASS Co., Ltd.) was used.

7. Decomposition Reaction (Under Irradiation with Visible Light) of 2-Propanol 50 mg of a particulate photocatalyst was spread over the bottom face of a glass vessel (volume: 330 ml) in an area measuring 15 mm×15 mm and the glass vessel was filled with synthetic air, and then 19 μmol of 2-propanol was injected. Immediately after injecting 2-propanol, visible light irradiation was carried out and, as a result, 2-propanol was decomposed by a photocatalytic reaction. Then, the concentration of acetone as the decomposition intermediate and the concentration of carbon dioxide as the complete decomposition product were determined by gas chromatography. As a light source, a xenon lamp (300 W, manufactured by Cermax) equipped with an ultraviolet light cut filter (L-42, manufactured by AGC TECHNO GLASS Co., Ltd.) was used.

8. Decomposition Reaction (Under Darkness) of 2-Propanol

Under room light, 50 mg of a particulate photocatalyst was spread over the bottom face of a glass vessel (volume; 330 mL) in an area measuring 15 mm×15 mm and the glass vessel was filled with synthetic air, and then 19 μmol of 2-propanol was injected. Immediately after injection, the glass container was placed under darkness at room temperature and the concentration of acetone as the decomposition intermediate was determined by gas chromatography.

9. Decomposition Reaction (Under Darkness) of Formic Acid

Under room light, 50 mg of a particulate photocatalyst was spread over the bottom face of a glass vessel (volume: 330 mL) in an area measuring 15 mm×15 mm and the glass vessel was filled with synthetic air, and then 53 μmol of formic acid was injected. Immediately after injection, the glass container was placed under darkness at room temperature and the concentration of carbon dioxide as the complete decomposition intermediate was determined by gas chromatography.

Example 1

Particle size distribution of a commercially available particulate tungsten oxide ($WO_3$, purity 99.99%, manufactured by JAPAN PURE CHEMICAL CO., LTD.) was measured by a particle size distribution analyzer (manufactured by Shimadzu Corporation). As a result, D10, D50 and D90 were respectively 0.046 μm, 0.215 μm and 5.726 μm. Thus, D90/D10 was 124. BET surface area was 6.0 $m^2/g$ and thus a primary particle size was 140 nm.

Figure 2:
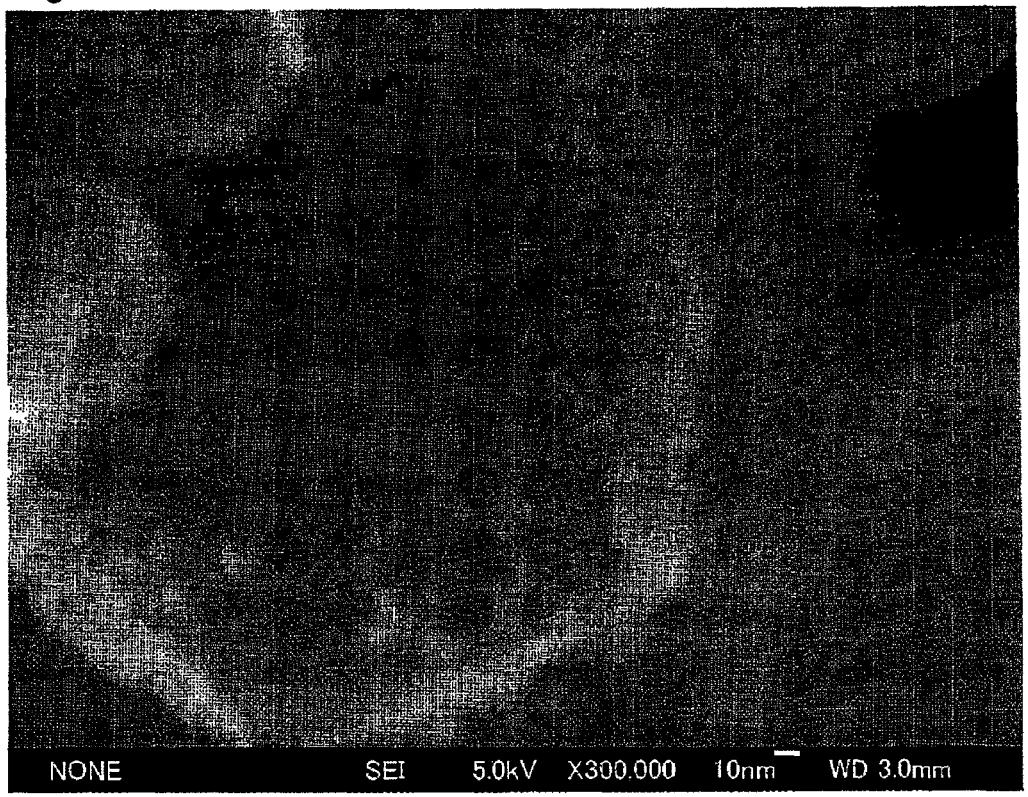
FIG 2 is a partially enlarged micrograph of the SEM micrograph of FIG 1.
Figure 3:
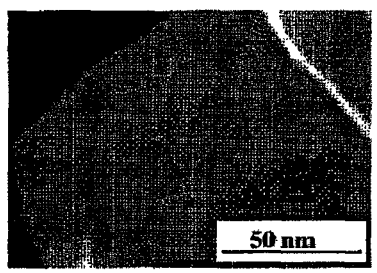
FIG 3 is a scanning transmission electron microscope (STEM) micrograph of the other portion of the tungsten oxide photocatalyst obtained in Example 1.

4 g of tungsten oxide particles 4 g was dispersed in 50 mL of water and, after supersonic wave irradiation was carried out for 5 minutes, particles having a large particle size were sedimented and separated by a centrifugal separator (H-201F, manufactured by Kokusan Co., Ltd.) at a rotational speed of 1,000 rpm for 10 minutes. Particle distribution of particles dispersed in water was measured. As a result, D10, D50 and D90 were respectively 0.074 μm, 0.131 μm and 0.365 μm. Thus, D90/D10 was 4.93. BET surface area was 8.5 $m^2/g$ and thus a primary particle size was calculated at 99 nm. 0.5 g of the resulting tungsten oxide particles were dispersed in 50 mL of water and an aqueous hexachloroplatinic acid solution ($H_2PtCl_6$) having a concentration of 0.019 mol/L was added so as to control the amount of Pt to 0.5 parts by weight based on 100 parts by weight of the tungsten oxide particles, followed by irradiation with visible light for 2 hours while stirring. As a light source, a xenon lamp (300 W, manufactured by Cermax) equipped with an ultraviolet light cut filter (L-42, manufactured by AGC TECHNO GLASS Co., Ltd.) was used. To the above dispersion of the tungsten oxide particles, 5 mL of methanol was added, followed by irradiation with visible light for 2 hours while stirring in the same manner as described above. The dispersion was filtered, washed with water and then dried at 120° C. to obtain particulate Pt-supported tungsten oxide photocatalyst. The surface of the resulting photocatalyst was observed by SEM and STEM. A SEM micrograph is shown in FIG 1 to FIG 2, and a STEM micrograph is shown in FIG 3. As is apparent from the results of SEM and STEM observation, particles having a particle size of 10 to 20 nm are supported on the surface of the tungsten oxide particles (a SEM micrograph shown in FIG 1 and FIG 2) and also the particles are independently supported on the surface at least a portion of the surface of tungsten oxide particles in a state where plural particles are contacted with each other (a STEM micrograph shown in FIG 3). Furthermore, these particles were observed by STEM-EDX. As a result, it was found that these particles are composed of Pt particles having a primary particle size of 5 nm.

Using the resulting photocatalyst, a decomposition reaction of acetic acid was carried out under irradiation with visible light. As a result, the formation rate of carbon dioxide was 190 μmol/h.

Using the resulting photocatalyst, the decomposition reaction of acetaldehyde was carried out under irradiation with visible light. As a result, the amount of carbon dioxide formed during 0 to 30 minutes after the initiation of light irradiation was 12.4 μmol, the amount of carbon dioxide formed during 30 to 60 minutes was 13.2 μmol, and the amount of carbon dioxide formed during 60 to 90 nm minutes was 0.3 μmol 55 minutes after the initiation of light irradiation, the concentration of acetaldehyde decreased to 0 μmol. As is apparent from a decrease in the amount of acetaldehyde and the amount of carbon dioxide formed, acetaldehyde has completely been decomposed.

Using the resulting photocatalyst, a decomposition reaction of 2-propanol was carried out. 70 minutes after injecting 2-propanol in the reaction container, the amount of 2-propanol decreased to 0 μmol under darkness and 12 μmol of acetone as the decomposition intermediate was formed, however, carbon dioxide as the complete decomposition product was not formed. When visible light irradiation was carried out immediately after injecting 2-propanol in the reaction container, the amount of 2-propanol decreased to 0 μmol after 20 minutes under light irradiation, and 9.4 μmol of acetone and 2.7 μmol of carbon dioxide were respectively formed. When visible light irradiation was further continued, the amount of acetone decreased to 0 μmol and the amount of carbon dioxide formed increased to 46 μmol 80 minutes after visible light irradiation.

Using the resulting photocatalyst, the decomposition reaction of formic acid was carried out under darkness. As a result, the amount of formic acid decreased to 0 μmol 28 minutes after injecting formic acid and the amount of carbon dioxide formed as the complete decomposition product increased to 51 ppm.

Example 2

In the same manner as in Example 1, except that tungsten oxide particles sedimented by a centrifugal separator in Example 1 were used, a particulate Pt-supported tungsten oxide photocatalyst was obtained. Particle distribution of the resulting tungsten oxide particles was measured. As a result, D10, D50 and D90 were respectively 7.320 μm, 12.159 μm and 17.007 μm. Thus, D90/D10 was 2.32. BET surface area was 4.8 $M^2/g$ and thus the primary particle size was calculated at 175 nm. The surface of the resulting photocatalyst was observed by SEM. As a result, it was found that particles having a particle size of 10 to 20 nm are supported on the surface of tungsten oxide particles, similar to Example 1. Furthermore, the particles were observed by STEM-EDX. As a result, the particles are agglomerated particles composed of Pt particles having a primary particle size of 5 nm.

Using the resulting photocatalyst, the decomposition reaction of acetic acid was carried out under irradiation with visible light. As a result, the formation rate of carbon dioxide was 120 μmol/h.

Example 3

In the same manner as in Example 1, except that the aqueous hexachloroplatinic acid solution was used so as to control the amount of Pt to 0.05 parts by weight based on 100 parts by weight of tungsten oxide particles, Pt-supported tungsten oxide particles were prepared. The surface of the resulting photocatalyst was observed by SEM. As a result, it was found that the same Pt particles having a particle size of 10 to 20 nm as in Example 1 are supported on the surface of tungsten oxide particles.

Using the resulting photocatalyst, the decomposition reaction of acotic acid was carried out under irradiation with visible light. As a result, the formation rate of carbon dioxide was 70 µmol/h.

Using the resulting photocatalyst, the decomposition reaction of acetaldehyde was carried out under irradiation with visible light. As a result, the amount of carbon dioxide formed during 0 to 30 minutes after the initiation of light irradiation was 10.6 µmol, the amount of carbon dioxide formed during 30 to 60 nm minutes was 4.2 µmol, and the amount of carbon dioxide formed during 60 to 90 minutes was 4.2 µmol. 200 minutes after the initiation of light irradiation, the concentration of acetaldehyde decreased to 0.3 µmol or less.

Example 4

In the same manner as in Example 1, except that the aqueous hexachloroplatinic acid solution was used so as to control the amount of Pt to 0.1 parts by weight based on 100 parts by weight of tungsten oxide particles, Pt-supported tungsten oxide particles were prepared. The surface of the resulting photocatalyst was observed by SEM. As a result, it was found that the same Pt particles having a particle size of 10 to 20 nm as in Example 1 are supported on the surface of tungsten oxide particles.

Using the resulting photocatalyst, the decomposition reaction of acetic acid was carried out under irradiation with visible light. As a result, the formation rate of carbon dioxide was 110 µmol/h.

Using the resulting photocatalyst, the decomposition reaction of acetaldehyde was carried out under irradiation with visible light. As a result, the amount of carbon dioxide formed during 0 to 30 minutes after the initiation of light irradiation was 15.7 µmol, the amount of carbon dioxide formed during 30 to 60 minutes was 11.3 µmol, and the amount of carbon dioxide formed during 60 to 90 nm minutes was 1.8 µmol. 55 minutes after the initiation of light irradiation, the concentration of acetaldehyde decreased to 0 µmol. As is apparent both from a decrease in the amount of acetaldehyde and from the amount of carbon dioxide formed, acetaldehyde has completely been decomposed.

Example 5

In the same manner as in Example 1, except that the aqueous hexachloroplatinic acid solution was used so as to control the amount of Pt to 0.2 parts by weight based on 100 parts by weight of tungsten oxide particles, Pt-supported tungsten oxide particles were prepared. The surface of the resulting photocatalyst was observed by SEM. As a result, it was found that the same Pt particles having a particle size of 10 to 20 nm as in Example 1 are supported on the surface of tungsten oxide particles.

Using the resulting photocatalyst, the decomposition reaction of acetic acid was carried out under irradiation with visible light. As a result, the formation rate of carbon dioxide was 160 µmol/h.

Using the resulting photocatalyst, the decomposition reaction of acetaldehyde was carried out under irradiation with visible light. As a result, the amount of carbon dioxide formed during 0 to 30 minutes after the initiation of light irradiation was 10.4 µmol, the amount of carbon dioxide formed during 30 to 60 minutes was 8.7 µmol, and the amount of carbon dioxide formed during 60 to 90 nm minutes was 7.8 µmol. 75 minutes after the initiation of light irradiation, the concentration of acetaldehyde decreased to 0 µmol. As is apparent both from a decrease in the amount of acetaldehyde and from the amount of carbon dioxide formed, acetaldehyde has completely been decomposed.

Example 6

In the same manner as in Example 1, except that the aqueous hexachloroplatinic acid solution was used so as to control the amount of Pt to 1.0 parts by weight based on 100 parts by weight of tungsten oxide particles, Pt-supported tungsten oxide particles were prepared. The surface of the resulting photocatalyst was observed by SEM. As a result, it was found that the same Pt particles having a particle size of 10 to 20 nm as in Example 1 are supported on the surface of tungsten oxide particles.

Using the resulting photocatalyst, the decomposition reaction of acetic acid was carried out under irradiation with visible light. As a result, the formation rate of carbon dioxide was 230 µmol/h.

Using the resulting photocatalyst, the decomposition reaction of acetaldehyde was carried out under irradiation with visible light. As a result, the amount of carbon dioxide formed during 0 to 30 minutes after the initiation of light irradiation was 5.2 µmol, the amount of carbon dioxide formed during 30 to 60 minutes was 4.9 µmol, and the amount of carbon dioxide formed during 60 to 90 nm minutes was 4.4 µmol. 55 minutes after the initiation of light irradiation, the concentration of acetaldehyde decreased to 0 µmol. As is apparent both from a decrease in the amount of acetaldehyde and from the amount of carbon dioxide formed, acetaldehyde has completely been decomposed.

Example 7

In the same manner as in Example 1, except that the aqueous hexachloroplatinic acid solution was used so as to control the amount of Pt to 2.0 parts by weight based on 100 parts by weight of tungsten oxide particles, Pt-supported tungsten oxide particles were prepared. The surface of the resulting photocatalyst was observed by SEM. As a result, it was found that the same Pt particles having a particle size of 10 to 30 nm as in Example 1 are supported on the surface of tungsten oxide particles.

Using the resulting photocatalyst, the decomposition reaction of acetic acid was carried out under irradiation with visible light. As a result, the formation rate of carbon dioxide was 215 µmol/h.

Using the resulting photocatalyst, the decomposition reaction of acetaldehyde was carried out under irradiation with visible light. As a result, the amount of carbon dioxide formed during 0 to 30 minutes after the initiation of light irradiation was 5.9 µmol, the amount of carbon dioxide formed during 30 to 60 minutes was 8.5 µmol, and the amount of carbon dioxide formed during 60 to 90 nm minutes was 9.9 µmol. 85 minutes after the initiation of light irradiation, the concentration of acetaldehyde decreased to 0 µmol. As is apparent both from a decrease in the amount of acetaldehyde and from the amount of carbon dioxide formed, acetaldehyde has completely been decomposed.

Example 8

In the same manner as in Example 1, except that the aqueous hexachloroplatinic acid solution was used so as to control the amount of Pt to 3.0 parts by weight based on 100 parts by weight of tungsten oxide particles, Pt-supported tungsten oxide particles were prepared. The surface of the resulting photocatalyst was observed by SEM. As a result, it was found that the same Pt particles having a particle size of 10 to 30 nm as in Example 1 are supported on the surface of tungsten oxide particles and also agglomerated particles composed of larger Pt particles existed.

Using the resulting photocatalyst, the decomposition reaction of acetic acid was carried out under irradiation with visible light. As a result, the formation rate of carbon dioxide was 142 μmol/h.

Using the resulting photocatalyst, the decomposition reaction of acetaldehyde was carried out under irradiation with visible light. As a result, the amount of carbon dioxide formed during 0 to 30 minutes after the initiation of light irradiation was 3.5 μmol, the amount of carbon dioxide formed during 30 to 60 minutes was 3.6 μmol, and the amount of carbon dioxide formed during 60 to 90 nm minutes was 2.9 μmol. 195 minutes after the initiation of light irradiation, the concentration of acetaldehyde decreased to 0 μmol. As is apparent both from a decrease in the amount of acetaldehyde and from the amount of carbon dioxide formed, acetaldehyde has completely been decomposed.

Comparative Example 1

In the same manner as in Example 1, except that Pt was not supported, tungsten oxide particles were obtained. Using the resulting photocatalyst, the decomposition reaction of acetic acid was carried out under irradiation with visible light. As a result, the formation rate of carbon dioxide was 8 μmol/h.

Using the resulting photocatalyst, the decomposition reaction of acetaldehyde was carried out under irradiation with visible light. As a result, the amount of carbon dioxide formed during 0 to 30 minutes after the initiation of light irradiation was 7.2 μmol, the amount of carbon dioxide formed during 30 to 60 minutes was 1.1 μmol, and the amount of carbon dioxide formed during 60 to 90 nm minutes was 0.1 μmol. The formation rate of carbon dioxide was high immediately after light irradiation and then quickly decreased as the amount of carbon dioxide formed became closer to half of the amount of the theoretical amount. 400 minutes after light irradiation, the concentration of acetaldehyde was 2.9 μmol.

Using the resulting photocatalyst, the decomposition reaction of 2-propanol was carried out. 70 minutes after injecting 2-propanol in the reaction container, the amount of 2-propanol decreased to 16 μmol under darkness and acetone as the decomposition intermediate and carbon dioxide as the complete decomposition product were not formed. When visible light irradiation is carried out immediately after injecting 2-propanol in the reaction container, the amount of 2-propanol decreased to 0 μmol after 200 minutes under light irradiation, and 8.9 μmol of acetone and 1.0 μmol of carbon dioxide were formed. Furthermore, visible light irradiation was carried out. As a result, the amount of acetone decreased to 0 μmol 1,440 minutes after visible light irradiation, and the amount of carbon dioxide formed was 19 μmol.

Comparative Example 2

Figure 4:
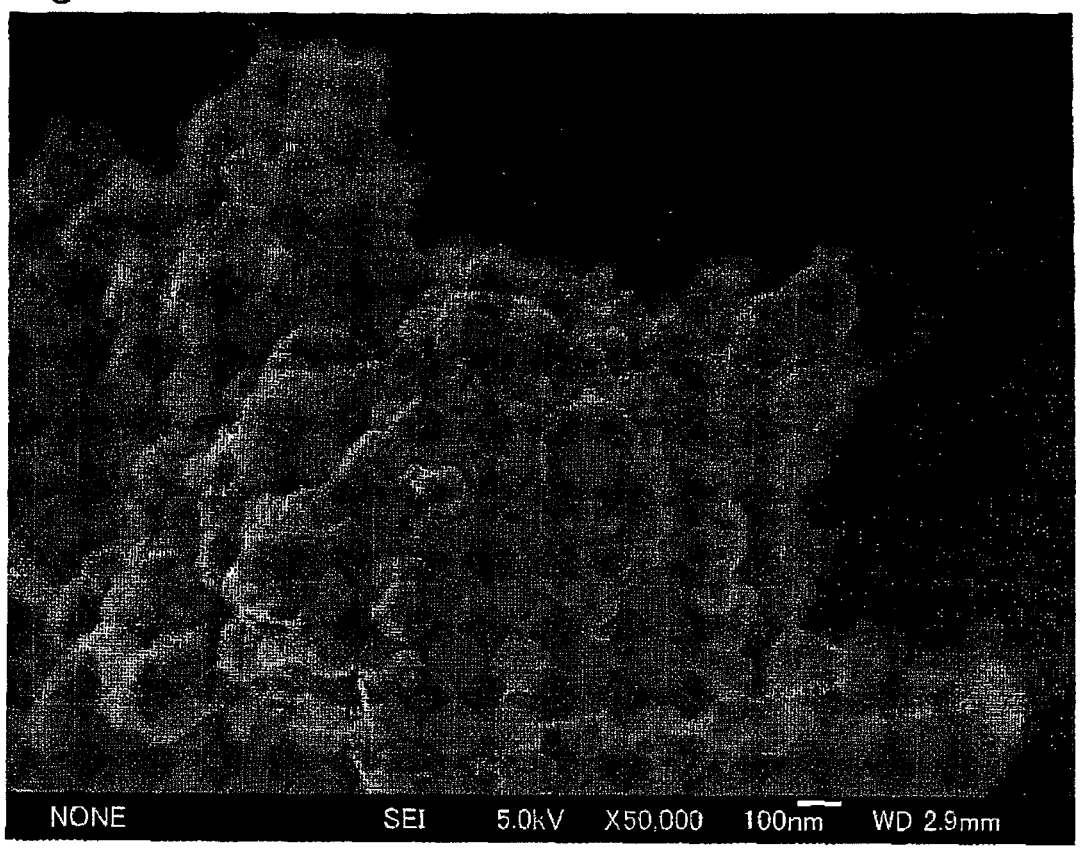
FIG 4 is a SEM micrograph of the tungsten oxide photocatalyst obtained in Comparative Example 2.

The commercially available tungsten oxide powder of Example 1 was added to an aqueous hexachloroplatinic acid solution without subjecting to a centrifugal separation operation, followed by sufficient mixing, drying at 80° C. and further calcinations in air at 500° C. for 30 minutes. The supporting amount of Pt was 0.5 parts by weight based on 100 parts by weight of tungsten oxide particles. The surface of the resulting photocatalyst was observed by SEM. As a result, the same particles as observed in Example 1 were not observed on the surface of tungsten oxide particles. A SEM micrograph is shown in FIG 4. Furthermore, the surface of tungsten oxide particles was observed by STEM-EDX. As a result, it was found that Pt is supported as agglomerated particles having a particle size of less than 10 nm composed of Pt particles having a primary particle size of 2 nm or less. Also, it was impossible to observe Pt particles in which plural particles are independently supported on the surface in a state where plural particles are contacted with each other.

Using the resulting photocatalyst, the decomposition reaction of acetic acid was carried out under irradiation with visible light. As a result, the formation rate of carbon dioxide was 50 μmol/h.

Using the resulting photocatalyst, the decomposition reaction of 2-propanol was carried out. 70 minutes after injecting 2-propanol in the reaction container, the amount of 2-propanol decreased to 10 μmol under darkness and acetone as the decomposition intermediate and carbon dioxide as the complete decomposition product were not formed. When visible light irradiation is carried out immediately after injecting 2-propanol in the reaction container, the amount of 2-propanol decreased to 0 μmol after 170 minutes under light irradiation, and 9.4 μmol of acetone and 1.0 μmol of carbon dioxide were formed. Furthermore, visible light irradiation was carried out. As a result, the amount of acetone decreased to 0 μmol 600 minutes after visible light irradiation, and the amount of carbon dioxide formed was 38 μmol.

Using the resulting photocatalyst, the decomposition reaction of formic acid was carried out under darkness. As a result, the amount of formic acid decreased to 4.2 μmol after 60 minutes and the amount of carbon dioxide formed as the complete decomposition product was 5.1 μmol.

Comparative Example 3

In the same manner as in Example 1, except that the aqueous hexachloroplatinic acid solution was used so as to control the amount of Pt to 0.01 parts by weight based on 100 parts by weight of tungsten oxide particles, Pt-supported tungsten oxide particles were prepared. The surface of the resulting photocatalyst was observed by SEM. As a result, it was found that the same Pt particles having a particle size of 10 to 20 nm as in Example 1 are supported on the surface of tungsten oxide particles and also agglomerated particles composed of larger Pt particles existed.

Using the resulting photocatalyst, the decomposition reaction of acetic acid was carried out under irradiation with visible light. As a result, the formation rate of carbon dioxide was 16 μmol/h.

Using the resulting photocatalyst, the decomposition reaction of acetaldehyde was carried out under irradiation with visible light. As a result, the amount of carbon dioxide formed during 0 to 30 minutes after the initiation of light irradiation was 11.1 μmol, the amount of carbon dioxide formed during 30 to 60 minutes was 1.6 μmol, and the amount of carbon dioxide formed during 60 to 90 nm minutes was 0.8 μmol. Similar to Comparative Example 4, the formation rate of carbon dioxide was high immediately after light irradiation and then quickly decreased as the amount of carbon dioxide formed became closer to half of the amount of the theoretical amount. 270 minutes after light irradiation, the concentration of acetaldehyde was 0.2 μmol.

Example 9

Photoelectrodeposition Utilizing Ultraviolet Light 0.5 g of the same commercially available powdered tungsten oxide used in Example 1 (purity 99.99%, manufactured by JAPAN PURE CHEMICAL CO., LTD.) was dispersed in 50 mL of an aqueous methanol solution having a concentration of 5% by volume and an aqueous hexachloroplatinic acid solution ($H_2PtCl_6$) having a concentration of 0.019 mol/L was added so as to control the amount of Pt to 0.5 parts by weight based on 100 parts by weight of tungsten oxide particles, followed by irradiation with light including ultraviolet light and visible light for 30 minutes while stirring. As a light source, a high-pressure mercury lamp (400 W) was used. The solution was filtered, washed with water and then dried at 120° C. to obtain a particulate Pt-supported tungsten oxide photocatalyst. The surface of the resulting photocatalyst was observed by SEM. As a result, it was found that particles having a particle size of 10 to 20 nm are supported on the surface of tungsten oxide particles, similar to Example 1. Furthermore, the resulting photocatalyst was observed by STEM. As a result, it was impossible to observe Pt particles in which plural particles are independently supported on the surface in a state where plural particles are contacted with each other.

Using the resulting photocatalyst, the decomposition reaction of 2-propanol was carried out. 70 minutes after injecting 2-propanol in the reaction container, the amount of 2-propanol decreased to 9.0 µmol under darkness and 6.0 µmol acetone as the decomposition intermediate was formed, however, carbon dioxide as the complete decomposition product was not formed. When visible light irradiation is carried out immediately after injecting 2-propanol in the reaction container, the amount of 2-propanol decreased to 0 µmol after 80 minutes under light irradiation, and 8.9 µmol of acetone and 0.5 µmol of carbon dioxide were formed. Furthermore, visible light irradiation was carried out. As a result, the amount of acetone decreased to 0 µmol 172 minutes after visible light irradiation, and the amount of carbon dioxide formed was 42 µmol.

Using the resulting photocatalyst, the decomposition reaction of formic acid was carried out under darkness. As a result, the amount of formic acid decreased to 3.7 µmol after 60 minutes and the amount of carbon dioxide formed as the complete decomposition product was 4.2 µmol.

In Example 1 to Example 8, the decomposition reaction of acetic acid was carried out in an aqueous solution and the optimum supporting amount for the reaction of Pt was 1% by weight. In contrast, the decomposition reaction of acetaldehyde was carried out in a vapor phase and the optimum supporting amount for the reaction of Pt was 0.1% by weight. This difference is considered that, in the case of the decomposition reaction in the vapor phase, since a large amount of oxygen is present as compared with that in an aqueous solution, a sufficient amount of oxygen can be reduced with a small supporting amount of Pt particles and thus a large amount of reactive oxygen species can be formed.

What is claimed is:

1. A tungsten oxide photocatalyst comprising tungsten oxide particles and Pt particles having a primary particle size of 3 to 20 nm supported on the surface of the tungsten oxide particles in an amount of 0.03 to 5 parts by weight based on 100 parts by weight of the tungsten oxide particles, and
the Pt particles are independently supported on the surface of the at least a portion of the surface of tungsten oxide particles in a state where the Pt particles are placed in contact with each other.

2. The tungsten oxide photocatalyst according to claim 1, wherein when a particle size of 50% accumulation from fine particle side of accumulative particle size distribution of an agglomerated particle size of the tungsten oxide particles is D50, D50 is from 0.01 to 5 µm and the primary particle size of the tungsten oxide particles is from 5 to 150 nm.

3. The tungsten oxide photocatalyst according to claim 2, wherein the tungsten oxide particles are particles of particulate $WO_3$.

4. A method for producing a photocatalyst, as defined in claim 3, which comprises the steps of:
(a) dispersing tungsten oxide particles in an aqueous solution containing a Pt compound dissolved therein in an amount corresponding to 0.03 to 5 parts by weight of Pt based on 100 parts by weight of tungsten oxide particles;
(b) irradiating with visible light in a wavelength range capable of photoexciting the tungsten oxide particles,
(c) adding a sacrificial agent; and
(d) further irradiating with visible light,
wherein said irradiating with visible light in steps (b) and (d) comprises irradiating with visible light without substantially irradiating with light having a wavelength of less than 410 nm.

5. A method for producing a photocatalyst, as defined in claim 2, which comprises the steps of:
(a) dispersing tungsten oxide particles in an aqueous solution containing a Pt compound dissolved therein in an amount corresponding to 0.03 to 5 parts by weight of Pt based on 100 parts by weight of tungsten oxide particles;
(b) irradiating with visible light in a wavelength range capable of photoexciting the tungsten oxide particles,
(c) adding a sacrificial agent; and
(d) further irradiating with visible light,
wherein said irradiating with visible light in steps (b) and (d) comprises irradiating with visible light without substantially irradiating with light having a wavelength of less than 410 nm.

6. A method for producing a photocatalyst, as defined in claim 1, which comprises the steps of:
(a) dispersing tungsten oxide particles in an aqueous solution containing a Pt compound dissolved therein in an amount corresponding to 0.03 to 5 parts by weight of Pt based on 100 parts by weight of tungsten oxide particles;
(b) irradiating with visible light in a wavelength range capable of photoexciting the tungsten oxide particles,
(c) adding a sacrificial agent; and
(d) further irradiating with visible light,
wherein said irradiating with visible light in steps (b) and (d) comprises irradiating with visible light without substantially irradiating with light having a wavelength of less than 410 nm.

7. The method according to claim 6, further comprising the step (e) of washing with water after further irradiating with visible light.

8. The method according to claim 7, wherein said irradiating with visible light is for 30 minutes or more.

9. The method according to claim 6, wherein said irradiating with visible light is for 30 minutes or more.

10. The tungsten oxide photocatalyst according to claim 1, wherein the tungsten oxide particles are particles of particulate $WO_3$.

11. A method for producing a photocatalyst, as defined in claim 10, which comprises the steps of:
(a) dispersing tungsten oxide particles in an aqueous solution containing a Pt compound dissolved therein in an amount corresponding to 0.03 to 5 parts by weight of Pt based on 100 parts by weight of tungsten oxide particles;
(b) irradiating with visible light in a wavelength range capable of photoexciting the tungsten oxide particles,
(c) adding a sacrificial agent; and
(d) further irradiating with visible light,
wherein said irradiating with visible light in steps (b) and (d) comprises irradiating with visible light without substantially irradiating with light having a wavelength of less than 410 nm.

* * * * *